*R. Winans,*
*Exhaust Mechanism for Locomotives.*
*N° 1,868.   Patented Nov. 26, 1840.*
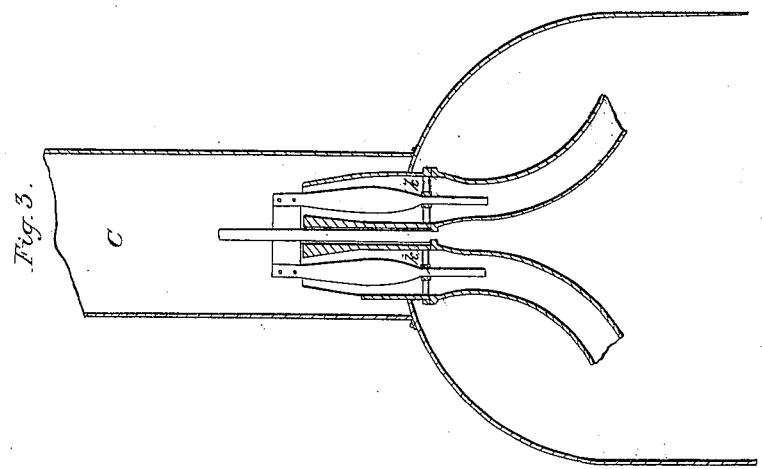
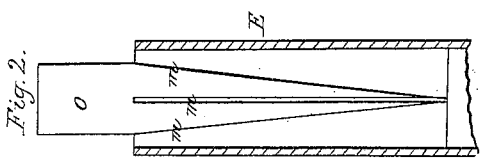
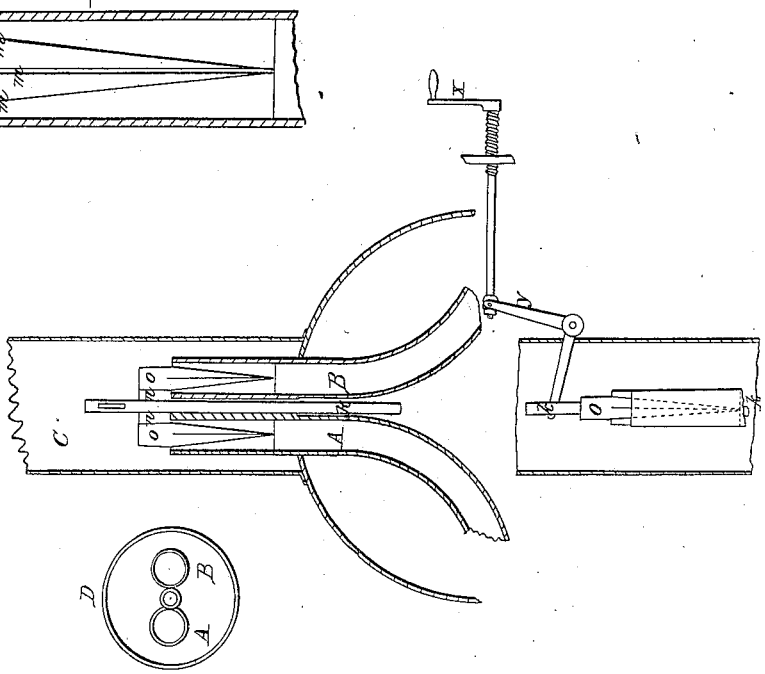

UNITED STATES PATENT OFFICE.

ROSS WINANS, OF BALTIMORE, MARYLAND.

MODE OF REGULATING THE WASTE STEAM IN LOCOMOTIVE STEAM-ENGINES.

Specification of Letters Patent No. 1,868, dated November 26, 1840.

*To all whom it may concern:*

Be it known that I, Ross WINANS, civil engineer, of the city of Baltimore, in the State of Maryland, have invented an Improvement in the Manner of Constructing Locomotive Steam-Engines, by which improvement the action of the waste steam may be so regulated as to increase or diminish the draft of the furnace at pleasure while the engine is in operation and the locomotive under way; and I do hereby declare that the following is a full and exact description thereof.

In the locomotive steam engine, as ordinarily constructed, the steam, after it has performed its office in the cylinders, is, under the name of waste steam, conducted through pipes denominated waste pipes, into the chimney of the engine, and is suffered to escape from these pipes in a vertical direction so as greatly to increase the natural draft through the fire, and thereby to augment the quantity of steam produced. It is a matter of great importance, however, in the management of the engine, to be able to regulate the amount of this increased draft, so as to increase or diminish the power of the engine according to the varying circumstances to which it is subjected when in use. It is obvious, for example, that to take a loaded train of cars up an ascending grade, requires more power than is necessary to propel it along a level; and that in a descending grade, it is frequently desirable that the power should be diminished; there are other circumstances, also, as is well known to every competent engineer, under which the ability to regulate the power of the engine is not only desirable, but of vast importance. The force with which the steam will escape from the orifices of the waste pipes into the chimney, is determined by the elasticity of the steam, and the size of the orifices of the escape pipes; and by being able to change the latter, the velocity with which the steam shall issue may be determined, and with this also the augmentation, or diminution, of the draft will be regulated. In the construction of this part of the engine, as heretofore made, it has been the aim of the builder so to proportion the size of the orifices of the waste pipes as that the steam shall issue from them with what may be denominated a medium velocity, which, however, under the same elasticity, could not be varied, as the orifices were to remain of the same determinate size.

Now my invention consists in a contrivance by which the engineer is enabled, in those engines in which the draft is increased by the discharge of the exhaust steam into the chimney, and while the engine is in motion, to increase, or to diminish, the draft in the chimney at pleasure, by enlarging or contracting the orifices of the pipes there, so as to adapt the draft to the occasion, regulating the heat and steam generated to the particular exigency. The following is a description of the manner in which I effect this object.

In the engines in common use, the escape pipes by which the steam passes from the cylinders into the chimney, are contracted in size at their upper ends forming the orifices herein mentioned. In my invention, I propose to give to them a uniform diameter throughout, say three or four inches according to circumstances, as shown in the accompanying drawing, where A, and B, represent the escape pipes, and C, the chimney of a locomotive. In each of these pipes I place an inverted cone, O, O, made of metal, the upper end of which terminates in a cylinder, the diameter of which cylinder is so adjusted, with reference to the diameter of the escape pipe, as to allow between them, when the cone and cylinder are placed in the escape pipes, as small a space for the escape of the steam as is at any time allowable; so that when the cone and cylinder, which for brevity I term a damper, is in the position represented in the drawing, Figure 1, the steam passes into the chimney with the greatest velocity, and the draft is the greatest. It will be seen at once by inspection of the drawing, that when the damper is raised, a part of the cone less in diameter is brought on a horizontal line with the top of the escape pipe, and the opening for the steam to pass into the chimney is increased, and that in proportion as the damper is raised, until when the point of the damper is lifted to a line with the top of the pipe, the escape of the steam into the chimney is unrestrained by it, and, of course, the least increase of natural draft is obtained. A contrivance by which the engine man can, at his pleasure, raise or lower the dampers will enable him, therefore, to open or contract the orifices of the pipes, and, consequently, to regulate the draft according to the particular emergency. This may be effected in various ways well known to machinists; one that would answer the purpose is exhibited in Figure 1, where the engine-man by turning the winch X moves the bent lever Y, which in its turn raises or sinks the damper O. In order to steady the dampers and keep them properly adjusted in the pipes, I affix three or four wings to each damper, extending from the apex to the base of the cone; these wings, which consist of thin plates, stand in the direction of the radii of the horizontal section of the cone, and their outer edges touch the inside of the pipe. They are represented at *m, m,* in the drawing Fig. 1. To make the motion of the dampers simultaneous in both pipes, their upper, or cylindrical portions are connected by extending one of the wings up the adjacent sides of said portions, so that one of the wings is common to the two dampers, as at *n, n,* Fig. 1. Further to steady and guide the said dampers, a rod may be made to pass between the two pipes so as to slide within a tube placed there for the purpose, as shown in Fig. 1, at *k;* to the upper part of which rod, one of the arms of the bent lever already mentioned may be attached, by means of which the dampers may be raised or lowered.

D, Fig. 1, is a plan showing the pipes and the tube between them without the dampers. E, Fig. 2, is a representation of the pipe enlarged with the damper in it. F, is a plan of the pipe enlarged, showing the damper and its flanges.

Fig. 3, exhibits a section of a chimney, and the two exhaust pipes, showing another modification of my contrivance for producing the same result. The dampers here, instead of being inverted cones, are in such a form as to operate like direct cones, and the opening between them and the sides of the pipe instead of being the smallest that is allowable, when the dampers are depressed, is the largest, and it is by raising, not by sinking, the dampers that the opening is decreased and the draft increased. In Fig. 3, the dampers, in place of being steadied in the pipes by flanges, as in Fig. 1, are shown as steadied by a prolongation of the rod to which the bent lever is attached downward through a hole in a piece of metal, which is placed for that purpose in the pipe below the damper, as at *k;* it being so formed as to serve as a guide to the said rod.

As already observed, there may be many contrivances for opening and closing the orifices of the pipes, besides the two above described; these two, however, will answer the purpose, and illustrate my object.

I do not claim the plan of increasing the natural draft by causing the steam from the cylinders to enter the chimney through diminished orifices; but I do claim as my invention, desiring to secure the same by Letters Patent, The plan of increasing or diminishing the force with which the steam from the cylinders enters the chimney, at the pleasure of the engine-man while the engine is in use or motion, by enlarging or contracting the orifices of the escape pipes, increasing or diminishing thereby, at pleasure, the draft of the chimney, in the manner above set forth; not intending by this claim to limit myself to the precise arrangement of the respective parts as herein described, but to vary the same as I may think proper, while I attain the same end by means substantially the same.

ROSS WINANS.

Witnesses:
 THOS. P. JONES,
 GEORGE WEST.